US006496868B2

(12) United States Patent
Krueger et al.

(10) Patent No.: US 6,496,868 B2
(45) Date of Patent: *Dec. 17, 2002

(54) TRANSCODING AUDIO DATA BY A PROXY COMPUTER ON BEHALF OF A CLIENT COMPUTER

(75) Inventors: Mark H. Krueger, Fukuoka (JP); Jay D. Logue, San Jose, CA (US)

(73) Assignee: WebTV Networks, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/953,849

(22) Filed: Sep. 17, 2001

(65) Prior Publication Data

US 2002/0013812 A1 Jan. 31, 2002

Related U.S. Application Data

(63) Continuation of application No. 09/452,293, filed on Nov. 30, 1999, now Pat. No. 6,308,222, which is a continuation of application No. 08/834,991, filed on Apr. 7, 1997, now Pat. No. 5,996,022, which is a continuation-in-part of application No. 08/656,924, filed on Jun. 3, 1996, now Pat. No. 5,918,013.

(51) Int. Cl.[7] .............................................. G06F 15/16
(52) U.S. Cl. ...................... 709/247; 709/202; 709/203; 709/217; 709/227; 709/228; 709/231; 709/232; 709/246; 704/500; 704/503; 370/235; 370/236
(58) Field of Search .............................. 709/200–203, 709/217–219, 227–229, 231–235, 246–247; 370/235–236; 704/500–504

(56) References Cited

U.S. PATENT DOCUMENTS

| 4,575,579 A | 3/1986 | Simon et al. .................. 178/4 |
| 4,852,151 A | 7/1989 | Dittakavi et al. ............. 379/97 |
| 4,922,523 A | 5/1990 | Hashimoto ................... 379/96 |
| 4,972,484 A | 11/1990 | Theile et al. ................. 381/37 |
| 4,975,944 A | 12/1990 | Cho .......................... 379/209 |

(List continued on next page.)

OTHER PUBLICATIONS

Farrow, Rik, "Securing the Web": fire walls, proxy servers, and data driven attacks, *InfoWorld*, Jun. 19, 1995, vol. 7, No. 25, pp. 103–104.

(List continued on next page.)

*Primary Examiner*—Bharat Barot
(74) *Attorney, Agent, or Firm*—Workman, Nydegger & Seeley

(57) ABSTRACT

A proxy server transcodes audio data on behalf of a client computer prior to transmitting the audio data to the client computer. In response to a request from the client computer, the proxy server obtains the audio data from a remote server. If the proxy server determines that transcoding is appropriate, the proxy server transcodes the audio data and transmits the transcoded audio data to the client computer. Transcoding can include changing the type of the audio file, compressing the audio data, reducing the number of audio channels, or reducing the data sampling rate. The proxy server determines the extent and type of transcoding based on file formats that the client computer can process, the size of the requested audio file, the memory capacity of the client computer, the bandwidth of the connection between the proxy server and the client computer, and the desired level of audio quality.

31 Claims, 6 Drawing Sheets

U.S. PATENT DOCUMENTS

| | | | |
|---|---|---|---|
| 4,995,074 A | 2/1991 | Goldman et al. | 379/97 |
| 5,005,011 A | 4/1991 | Perlman et al. | 340/728 |
| 5,095,494 A | 3/1992 | Takahashi et al. | 375/10 |
| 5,220,420 A | 6/1993 | Hoarty et al. | 358/86 |
| 5,241,587 A | 8/1993 | Horton et al. | 379/92 |
| 5,263,084 A | 11/1993 | Chaput et al. | 379/215 |
| 5,287,401 A | 2/1994 | Lin | 379/98 |
| 5,299,307 A | 3/1994 | Young | 395/161 |
| 5,325,423 A | 6/1994 | Lewis | 379/90 |
| 5,329,619 A | 7/1994 | Page et al. | 395/200.33 |
| 5,341,293 A | 8/1994 | Vertelney et al. | 364/419.17 |
| 5,369,688 A | 11/1994 | Tsukamoto et al. | 379/100 |
| 5,410,541 A | 4/1995 | Hotto | 370/76 |
| 5,425,092 A | 6/1995 | Quirk | 379/215 |
| 5,469,540 A | 11/1995 | Powers, III et al. | 395/158 |
| 5,488,411 A | 1/1996 | Lewis | 348/8 |
| 5,490,208 A | 2/1996 | Remillard | 379/96 |
| 5,526,353 A | 6/1996 | Henley et al. | 370/60 |
| 5,530,852 A | 6/1996 | Meske, Jr. et al. | 395/200.36 |
| 5,538,255 A | 7/1996 | Barker | 463/41 |
| 5,550,863 A | 8/1996 | Yurt et al. | 375/240 |
| 5,558,339 A | 9/1996 | Perlman | 463/42 |
| 5,561,709 A | 10/1996 | Remillard | 379/96 |
| 5,564,001 A | 10/1996 | Lewis | 395/154 |
| 5,570,363 A | 10/1996 | Holm | 370/62 |
| 5,572,643 A | 11/1996 | Judson | 395/200.48 |
| 5,586,257 A | 12/1996 | Perlman | 463/42 |
| 5,586,260 A | 12/1996 | Hu | 395/200.33 |
| 5,612,730 A | 3/1997 | Lewis | 348/8 |
| 5,623,600 A | 4/1997 | Ji et al. | 395/187.01 |
| 5,636,324 A | 6/1997 | Teh et al. | 315/2 |
| 5,654,886 A | 8/1997 | Zereski, Jr. et al. | 702/3 |
| 5,657,390 A | 8/1997 | Elgamai et al. | 380/49 |
| 5,657,450 A | 8/1997 | Rao et al. | 395/200.3 |
| 5,678,041 A | 10/1997 | Baker et al. | 395/200.59 |
| 5,692,105 A | 11/1997 | Leppanen et al. | 395/2 |
| 5,742,773 A | 4/1998 | Blomfield-Brown | 395/200 |
| 5,768,535 A | 6/1998 | Chaddha et al. | 395/200 |
| 5,802,367 A | 9/1998 | Held | 395/685 |
| 5,835,495 A | 11/1998 | Ferriere | 370/465 |
| 5,864,678 A | 1/1999 | Riddle | 395/200 |
| 5,996,022 A * | 11/1999 | Krueger et al. | 709/247 |
| 6,308,222 B1 * | 10/2001 | Krueger et al. | 709/247 |

OTHER PUBLICATIONS

*Administrator's Guide, Netscape Proxy Server Version 2.0*, Netscape Communications Corporation, pp. 19–20, 1996.

Chankhunthod, Anawat et al., "A Hierarchical Internet Object C ache," 1996 USEWIX Technical Conference (6 pages).

Matt Rosoff, Review: "Gateway Destination PC," c/net inc., 2 pages, Feb. 19, 1996.

Robert Seidman Article: What Larry and Lou Know (That You Don't), c/net inc., 2 pages, Jan. 29, 1996.

Susan Stellin, Article: "The $500 Web Box: Less is More?" c/net inc., 2 pages, 1996.

"Four Audio Distribution Options in the News," DIALOG(R) File 248:PIRA, © 1997 Pira International, 1 pg.

"RealAudio Client 3.0" DIALOG(R) File 248:PIRA, © 1997 Pira International, 1 pg.

"Real Progress: The Internet As Information Utility", DIALOG(R) File 248:PIRA, © 1997 Pira International, 1 pg.

"Digital Audio and Disabled Learners", DIALOG(R) File 2:INSPEC © 1997 Institution of Electrical Engineers, 1 pg.

"Emergine Technologies–New Opportunities in Platforms," DIALOG(R) File 647:CMP© 1997 CMP, 1 pg.

* cited by examiner

TRANSCODING AUDIO DATA BY A PROXY COMPUTER ON BEHALF OF A CLIENT COMPUTER

CROSS-REFERENCE TO RELATED APPLICATIONS

This application is a continuation of U.S. patent application Ser. No. 09/452,293, filed on Nov. 30, 1999, now issued as U.S. Pat. No. 6,308,222, which is a continuation of U.S. patent application Ser. No. 08/834,991, filed on Apr. 7, 1997, now issued as U.S. Pat. No. 5,996,022, which is a continuation-in-part of U.S. patent application Ser. No. 08/656,924, filed on Jun. 3, 1996, now issued as U.S. Pat. No. 5,918,013. The foregoing patents and patent applications are incorporated herein by reference.

BACKGROUND OF THE INVENTION

1. The Field of the Invention

The present invention pertains to the field of computer software. More particularly, the present invention relates to modifying audio files that are received and transmitted over a computer network.

2. Background and Related Art

The number of homes and businesses using personal computers has increased substantially in recent years, and along with this increase has come an explosion in the use of the Internet and, in particular, the World-Wide Web ("the Web"). The Web is a collection of formatted hypertext pages and other data located on numerous computers around the world that are logically connected by the Internet. Although the Web has in the past been a source of primarily scientific and technical information, it is now a valuable resource for information relating to almost any subject, including business, entertainment, travel, and education, to name just a few. Advances in network technology, and especially in software such as "Web browsers" (software applications which provide a user interface to the Web), have made the Web accessible to a large segment of the population.

There are problems associated with certain current Web-related technology, however, which can make browsing the Web unpleasant. One such problem is latency. People commonly experience long, frustrating delays when browsing the Web, such as when one's computer is establishing contact with a Web server or downloading a requested file. There are many possible causes of latency, including heavy communications traffic on the Internet, slow response time of Web servers, and the large size of some files that are downloaded. Latency tends to be particularly apparent when downloading audio files, for example, which tend to be large in comparison to other file types. It is desirable, therefore, to provide a technique for reducing certain latencies on the Web, such as those associated with audio files.

The use of audio on the Web is becoming increasingly more popular. Numerous audio formats are currently in use on the Web, including .AU, .AIFF, .WAV, MPEG, MIDI, Mod, etc. Even live audio can be downloaded from certain Web sites, as provided for by the RealAudio file format. Unfortunately, many people browse the Web using equipment that lacks the capability to process many of these file types, due to limitations in hardware, software, or both. Hence, it is desirable to provide a technique by which a computer or other processing system can access and play audio in a variety of different formats without requiring special hardware or software.

In addition, it is desirable for a computer or other processing system to be able to play an audio file without having to wait for the entire file to be downloaded from a remote server. One factor which makes this capability difficult to provide is that many audio data formats use a data rate that is significantly higher than that of the communication link between the server supplying the audio file and the requesting computer. As a result, in many systems, the requesting (client) computer would tend to run out of audio data if it attempted to play the data before the file was completely downloaded. Although portions of the file might be downloaded into memory and played before the file has finished downloading, memory limitations in the requesting computer may render this approach impractical. Therefore, it is desirable to provide a technique to enable a requesting computer or other processing system to play audio data as it is being received from a remote Web server while reducing the amount of audio data that must first be downloaded into memory.

BRIEF SUMMARY OF THE INVENTION

The present invention includes a method in a proxy computer system connected to a client computer system of providing audio data to the client computer system such that latency is reduced. In the method, the proxy computer system obtains the audio data from a remote server on behalf of the client computer system and determines whether transcoding the obtained audio data is appropriate. If transcoding is appropriate, the audio data is transcoded using one or more transcoding methods thereby generating transcoded audio data. These transcoding methods may include, for example, 1) reducing the number of channels, 2) reducing the sample rate, and 3) compression. The transcoded audio data is then transmitted to the client computer system.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION OF THE PREFERRED EMBODIMENTS

A method and apparatus for transcoding audio data are described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to facilitate description of the present invention.

In one embodiment, steps according to the present invention are embodied in machine-executable software instructions, and the present invention is carried out in a processing system by a processor executing the instructions, as will be described in greater detail below. In other embodiments, hardwired circuitry may be used in place of, or in combination with, software instructions to implement the present invention.

The present invention relates in one embodiment to a system in which a client computer system is connected to one or more server computer systems over the Internet. The client system enables its user to request and receive hypertext documents and other data from remote servers on the World Wide Web. In accordance with the present invention, as will be described below in detail, at least one server acts as a proxy for the client by retrieving audio files requested by the client from other servers, transcoding (modifying) the retrieved audio files based on the hardware and software capabilities of the client and communication bandwidth constraints, and then downloading the transcoded audio files to the client.

In one embodiment, the present invention relates to a system known as WebTV™ (WebTV), which uses a standard television set as a display device for browsing the Web and which connects to a conventional network, such as the Internet, using a standard telephone, ISDN, or other communication link. In accordance with the present invention, a user of a WebTV client system can utilize WebTV network services provided by one or more remote WebTV servers. The WebTV network services are used in conjunction with software running in a WebTV client system to browse the Web, send electronic mail, and to make use of the Internet in various other ways. The WebTV servers function as proxies by retrieving from a remote server Web documents (e.g., Web pages) and other data requested by a WebTV client system and then transmitting the requested information to the WebTV client system.

I. System Overview

Figure 1:
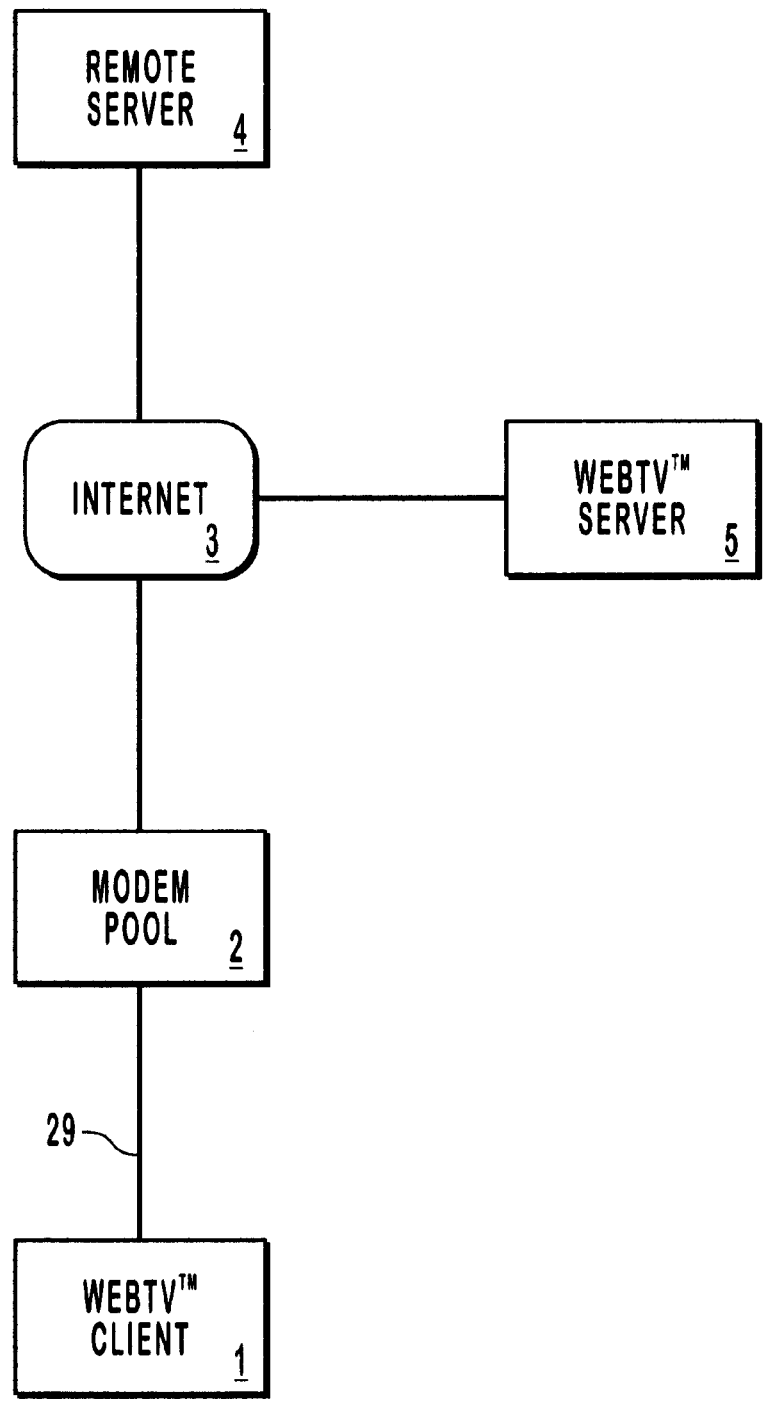
FIG. 1 illustrates a WebTV client system connected to a WebTV server system.

FIG. 1 illustrates a configuration of a WebTV network according to one embodiment. A WebTV client 1 is coupled to a modem pool 2 via direct-dial, bi-directional data connections 29, which may be a conventional telephone, i.e., "plain old telephone service" (POTS), ISDN (Integrated Services Digital Network) link, Ethernet, or any other suitable type of data connection. The modem pool 2 is coupled typically through a router, such as that conventionally known in the art, to a number of remote servers 4 (i.e., conventional Web servers) via a conventional network infrastructure 3, such as the Internet. The WebTV system also includes a WebTV server 5, which implements WebTV Network services and specifically supports the WebTV client 1. The server 5 generally includes one or more conventional computer systems. The server 5 may actually comprise multiple physical and logical devices connected in a distributed architecture. The client 1 can connect to the server 5 through POTS, ISDN, or Ethernet connection or through the Internet 3 via the modem pool 2. Note that the modem pool 2 is a conventional modem pool, such as those found today throughout the world providing access to the Internet and private networks. The modem pool 2 may be provided by a local Internet Service Provider (ISP).

A. Client System Architecture

Figure 2:
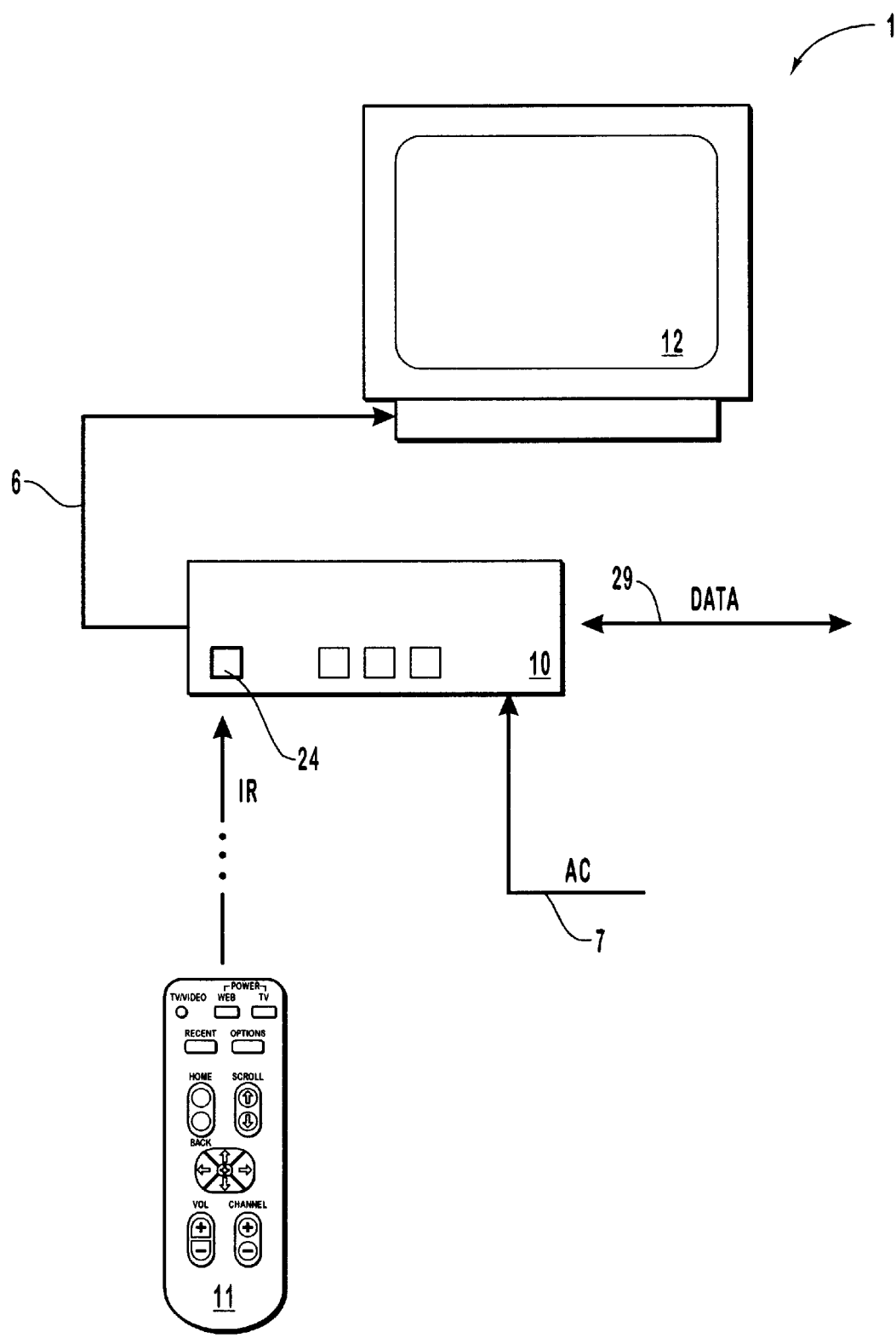
FIG. 2 illustrates a WebTV client system.

FIG. 2 illustrates a WebTV client system 1 according to one embodiment. The client system 1 includes an electronics unit 10 (hereinafter referred to as "the WebTV box 10" or "the box 10"), an ordinary television set 12, and a hand-held remote control 11. In an alternative embodiment (not shown), the WebTV box 10 is built into the television set 12 as an integral unit. The box 10 includes hardware and software for providing the user with a graphical user interface, by which the user can access the WebTV Network services, i.e., browse the Web, send e-mail, etc.

The client system 1 uses the television set 12 as a display device and an audio output device. The box 10 is coupled to the television set 12 by a link 6. The link 6 includes an audio channel for generating sound from the television's speaker and an RF (radio frequency), S-video, composite video, or other equivalent form of video channel. The data link 29 between the box 10 and the WebTV server 5 is a conventional telephone (POTS), ISDN, Ethernet, or other suitable data connection. The box 10 receives AC (alternating current) power through a standard AC power line 7.

Remote control 11 is operated by the user in order to control the client system 1 to browse the Web and otherwise access the Internet. The box 10 receives commands from remote control 11 via an infrared (IR) communication link 24. In alternative embodiments, the link between the remote control 11 and the box 10 may be an RF link or any other suitable type of link.

B. Server System Architecture

Figure 3:
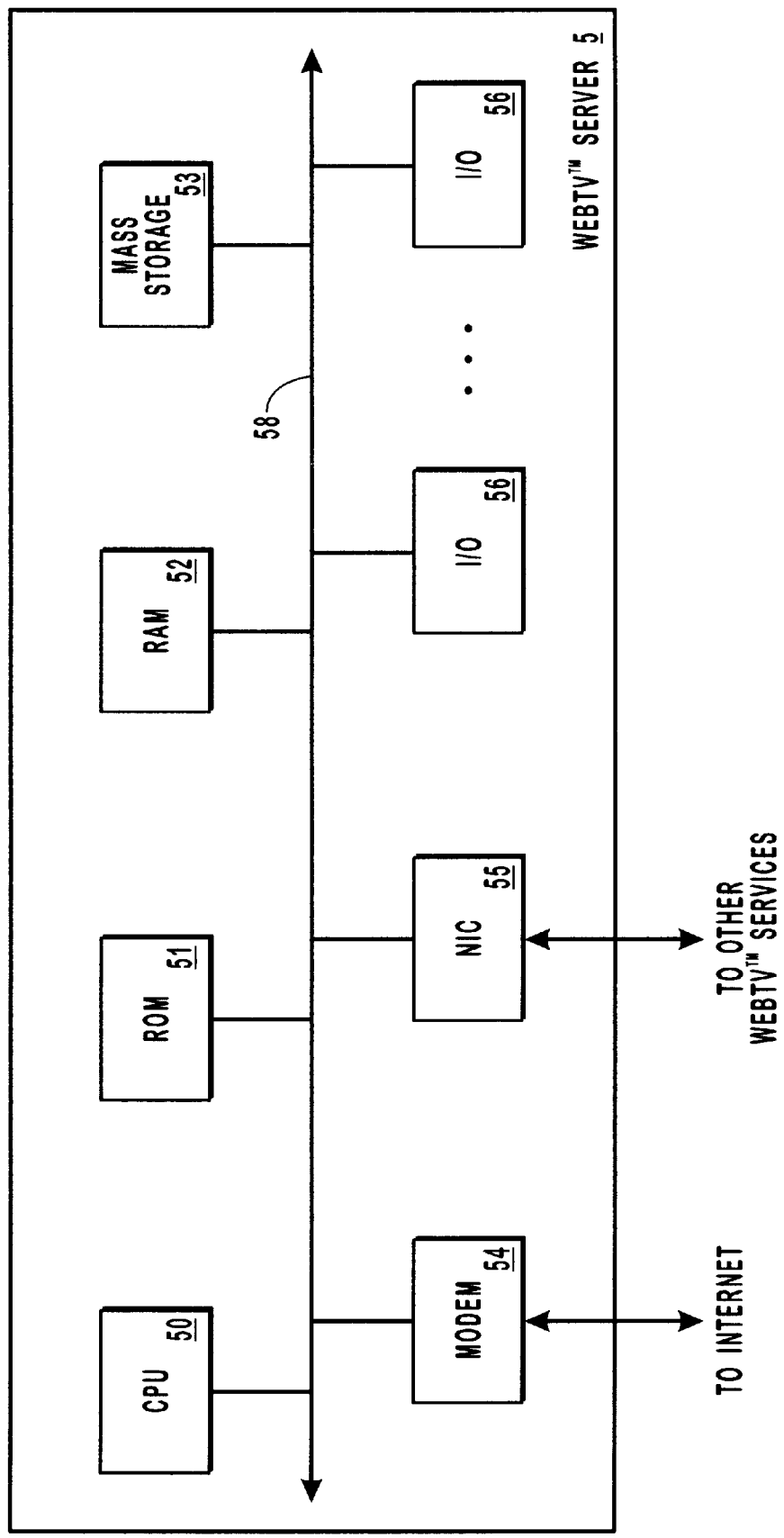
FIG. 3 illustrates a WebTV server system.

The WebTV server 5 generally includes one or more computer systems, each generally having the architecture illustrated in FIG. 3. It should be noted that the illustrated architecture is only exemplary; a WebTV server is not constrained to the illustrated architecture. The illustrated architecture includes a central processing unit (CPU) 50, read-only memory (ROM) 51, random access memory (RAM) 52, a mass storage device 53, a modem 54, a network interface card (NIC) 55, and various other input/output (I/O) devices 56. Mass storage device 53 includes any suitable non-volatile storage medium, such as a magnetic storage disk or tape, CD-ROM (Compact Disk ROM), CD-R (Compact Disk Recordable), or DVD (Digital Versatile Disk). I/O devices 56 may include any or all of devices such as a display monitor, keyboard, cursor control device, etc. Modem 54 is used to communicate data to and from remote servers 4 via the Internet. Note that modem 54 may represent a standard telephone modem or any other suitable data communication device, such as an ISDN adapter, for example.

Because the server 5 may actually comprise multiple physical and logical devices connected in a distributed architecture, NIC 55 may be used to provide data communication with other devices that are part of the WebTV services. Modem 54 may also be used to communicate with other devices that are part of the WebTV services and which are not located in close geographic proximity to the illustrated device.

The present invention includes steps which may be embodied as machine-executable instructions. For example, in one embodiment the present invention is carried out in the WebTV server 5 by the CPU 50 executing sequences of instructions contained in ROM 51, RAM 52, mass storage device 53, or a combination of these storage devices. More specifically, execution of the sequences of instructions causes the CPU 50 to perform the steps of the present invention. Such steps will be described below. Certain embodiments and aspects of the present invention may be carried out in the WebTV client system 1 instead of, or in addition to, being carried out in the WebTV server 5.

Computer instructions embodying the present invention may be loaded into memory from a persistent store (e.g., mass storage device 53) and/or from one or more other computer systems, referred to collectively as a "host computer system", over a network. For example, a host computer system may transmit the instructions to a requesting computer system in response to a message transmitted to the host computer system over the Internet 3 by the requesting computer system. As the requesting computer system receives the instructions via a network connection (e.g., a modem), the requesting computer system stores the instructions in a memory. The requesting computer system may store the instructions for later execution or execute the instructions as they arrive over the network connection. In some embodiments, the downloaded instructions may be directly supported by the requesting computer system's microprocessor. Consequently, execution of the instructions may be performed directly by the microprocessor. In other embodiments, the instructions may not be directly executable by the microprocessor. Under these circumstances, the instructions may be executed by causing the microprocessor to execute an interpreter that interprets the instructions, or by causing the microprocessor to execute instructions which convert the received instructions into instructions that can be directly executed by the microprocessor.

In various embodiments, hardwired circuitry may be used in place of, or in combination with, software instructions to implement the present invention. Thus, the present invention is not limited to any specific combination of hardware circuitry and software, nor to any particular source for the instructions executed by a computer system.

Figure 4:
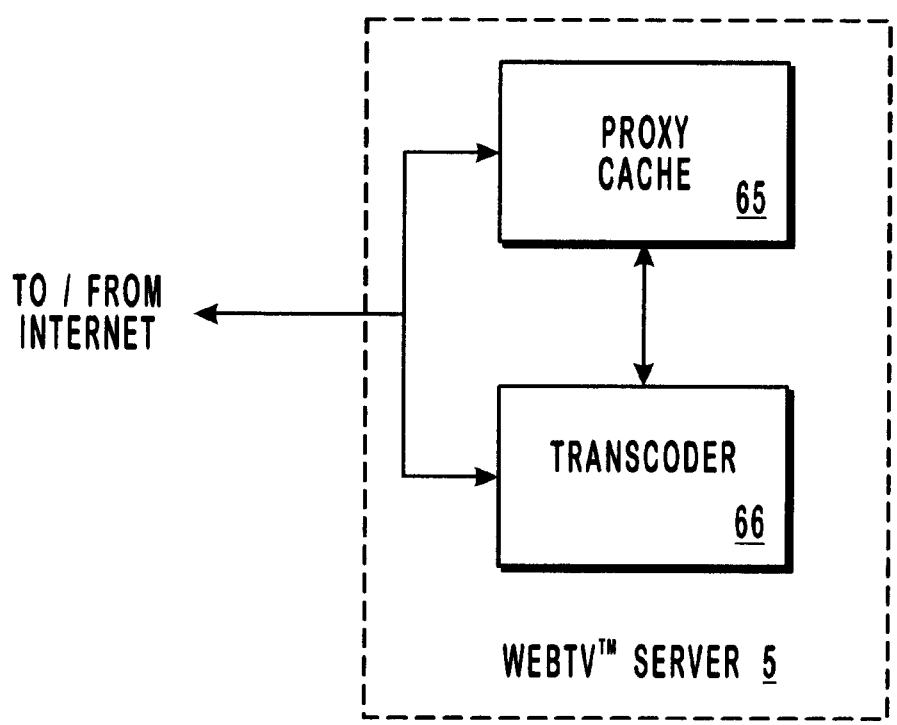
FIG. 4 illustrates a WebTV server including a proxy cache and a transcoder.

The WebTV server 5 generally functions as a proxy for the client 1 for purposes of providing the client 1 with access to a remote Web server 4 and to various services. In performing the proxy functions, the server 5 further provides caching and transcoding capabilities for the client 1, as illustrated in FIG. 4. Referring to FIG. 4, the WebTV server 5 includes a transcoder 66 and a proxy cache 65, which are functionally coupled together and to the Internet 3. The function of the proxy cache 65 is to temporarily store Web documents, images, and other information that is requested frequently by either the WebTV client 1 or the server 5. The function of the transcoder 66 is to automatically modify certain documents and files retrieved from a remote server 4. Modification such as this is referred to herein as "transcoding". Transcoding may be performed for various different purposes, depending upon the type of data that is being transcoded.

In accordance with the present invention, one function of the transcoder 66 is to transcode audio files requested by the client 1 to conform the audio files to the hardware and software capabilities of the client 1 and to meet bandwidth constraints of the communication link between the server 5 and the client 1, as will flow be described.

II. Audio Transcoding

Transcoding of audio data may include conversion of an audio file from one file type to another, compression of audio data, reduction of the number of audio channels represented by the audio data, or reduction of the sampling rate of the audio data, or a combination of these procedures. Transcoding in accordance with the present invention is not limited to the aforementioned operations, however.

Various audio file types are currently known, such as .AU, .AIFF, .WAV, MPEG (Moving Picture Experts Group), MIDI (Musical Instrument Digital Interface), RealAudio, Mod (Module), etc. If the client 1 is not configured (in terms of hardware, software, or both) to accommodate the file type of an audio file which it requests, then transcoding is performed by the server 5 to convert the requested audio file into a file type which the client 1 can accommodate. As a more specific example, it may be desirable to convert a streamed audio format, such as RealAudio, to a non-streamed format, such as .AU. Note that audio files generally specify the file type in a header within the audio file, which enables the server 5 to quickly determine that transcoding is required even before the entire file has been retrieved from the remote server 4.

Transcoding may include compression of audio data, reduction of the number of audio channels represented by the audio data, or reduction of the sampling rate of the audio data, in order to conform the data to the memory or other hardware configuration of the client 1 or the bandwidth of the communication link. For example, when a file is requested by the client 1, there is a download latency (delay) defined as the time from which the client 1 requests the file until the time at which the client 1 actually receives the file in its entirety. This latency tends to be quite variable because of the variable nature of Internet traffic and server use. However, latencies associated with downloading of audio files tend to be high due to the relatively large size of many audio files. Download latency is further affected by the speed of the communication devices (i.e., modems) involved in the data transfer and the bandwidth capacity of the communication link. Therefore, data compression and other techniques for reducing the amount of data that must be downloaded may be desirable in order to reduce such latencies. In addition, because the client 1 has a finite amount of storage capability, it may be further desirable to reduce the size of certain audio files (e.g., unusually large files).

In addition, transcoding according to the present invention can enable the client 1 to begin playing an audio file without having to wait for the entire file to be downloaded. One factor which makes it difficult to provide such capability in the absence of the present invention is that many audio data formats have a data rate that is significantly higher than that of the communication link between the server 5 and the client 1. As a result, in certain systems, a client would tend to run out of audio data if it attempted to play the data before the file was completely downloaded. Therefore, it may be desirable in some cases to reduce the data rate of a requested audio file. Hence, transcoding to reduce the data rate enables audio data to be streamed to the client 1, which data would be otherwise unusable on a system which uses a low bandwidth connection and/or limited storage capabilities.

A particular client 1 also might not be configured to play audio in stereo. Therefore, if a requested audio file includes stereo data, then the data can be transcoded into a single-channel ("mono") format to reduce the file size.

Transcoding may take the form of modification the audio file retrieved from the remote server 4, creation of an entirely separate audio file based on the audio file retrieved from the remote server 4, or both. In either case, the modified or new file is referred to as the "transcoded file".

When an audio file is requested by the client 1, the WebTV server 5 determines the extent and type of modifications to be performed on the audio file as the audio file is received by the WebTV server 5 from the remote server 4. Note that the above-described audio transcoding techniques may result in a trade-off between the resulting file size and the quality of audio that can be generated. Therefore, the extent and type of the modifications to the data are determined on the basis of the file format or formats which the client 1 is configured to handle, the size of the requested audio file, the memory capacity of the client, 1 the bandwidth of the connection between the local server and the client, and the level of audio quality that is desired or required. It is assumed that the WebTV server 5 has some form of knowledge of the hardware and software configuration of the client 1.

The server 5 can use any of three different modes for transcoding of audio files: (1) streamed transcoding, (2) buffered transcoding, and (3) deferred transcoding. Streamed transcoding is the transcoding of a file on a byte-by-byte basis (or a number of bytes at a time) as the file is being both retrieved from a remote server 4 and downloaded to the client 1—this mode is also referred to as transcoding "on-the-fly". Streamed transcoding is most desirable in terms of reducing the latency experienced by the client 1. It should be noted that the streamed transcoding mode does involve limited buffering of audio data, as will be explained below.

The buffered transcoding mode is used for certain files which must be completely buffered in the WebTV server 5 before they are transcoded. That is, a file may need to be buffered before transmitting it to the client 1 if the type of changes to be made can only be made after the entire file has been retrieved from the remote server 4. Because the process of retrieving and downloading a file to the client 1 increases latency and decreases throughput, it is not desirable to buffer all files. Therefore, the transcoder 66 uses any previously acquired information relating to requested audio files to determine whether a requested file must be buffered for purposes of transcoding, before the audio file is retrieved from a remote server 4. Such information may be stored in a persistent database within the WebTV server 5.

In the deferred mode, transcoding is deferred until after a requested file has been downloaded to a particular client 1. The deferred mode therefore reduces latency experienced by the client 1 in receiving the (non-transcoded) file and allows the transcoded file to be downloaded to a client 1 at a later time. Transcoding may be performed immediately after downloading to the client 1 or at any time thereafter. For example, it may be convenient to perform transcoding during periods of low usage of WebTV services, such as at night.

Figure 5:
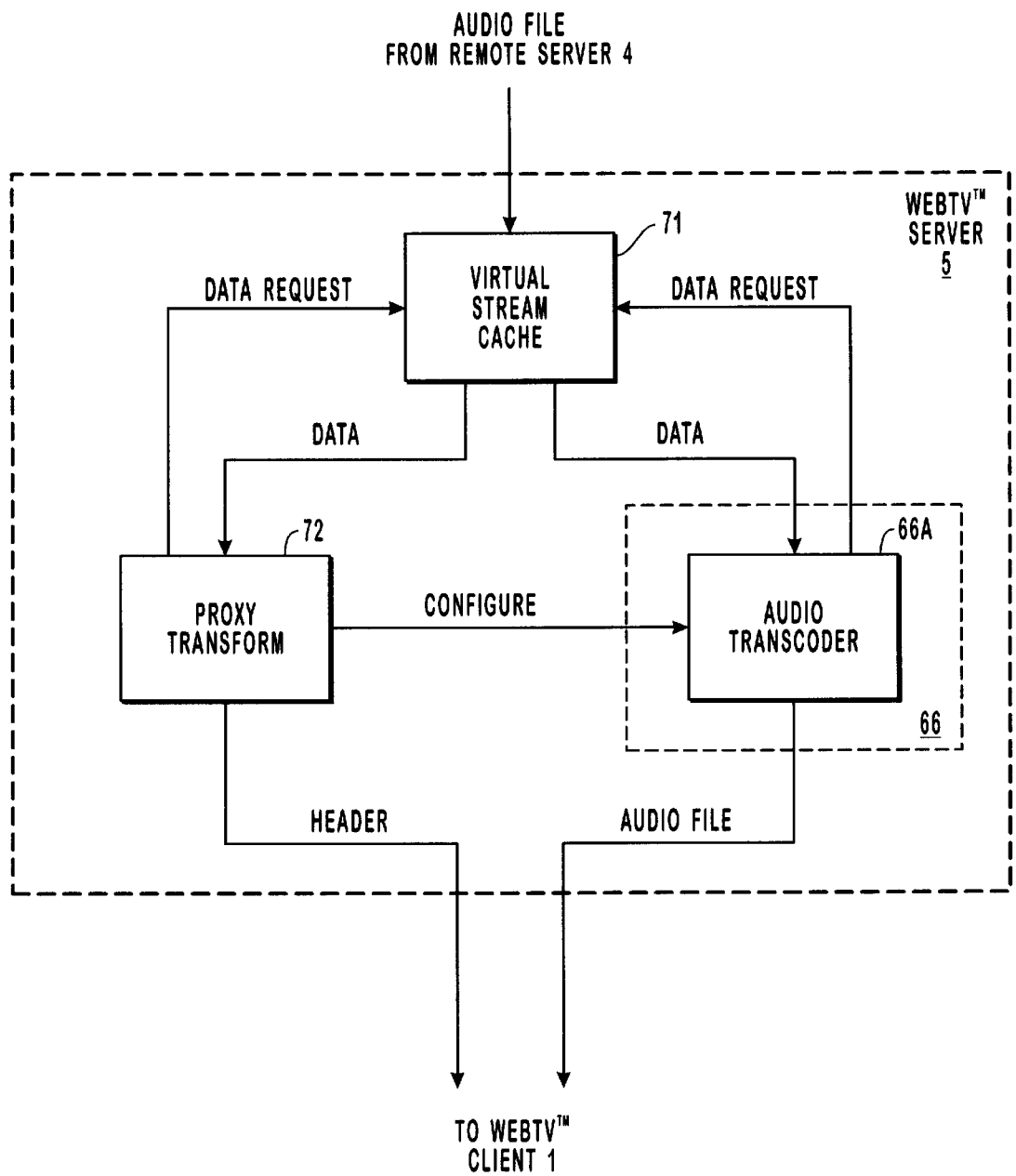
FIG. 5 illustrates a WebTV server including components for transcoding audio data.

FIG. 5 illustrates functional modules of a WebTV server 5 that are associated with the transcoding of audio data, according to one embodiment. The WebTV server 5 includes a virtual stream cache (VSC) 71 which receives a requested audio file from a remote server 4. The VSC 71 operates in either a random access mode or a sequential mode, as selected by the proxy transform module 72. In the random access mode, the VCS 71 buffers a small amount of audio data (relative to the file size) from the audio file being retrieved. This buffered data can be randomly accessed by the proxy transform module 72, the audio transcoder 6a, or both, as described below. Hence, when in the random mode, the VSC 71 effectively provides a file-like random access interface to otherwise sequential audio data. When switched to the sequential mode, any previously buffered audio data is discarded by the VSC 71 and any further audio data received by the VSC 71 is output sequentially (byte-by-byte or a number of bytes at a time) to the proxy transform module 72 or the audio transcoder 66a.

By examining audio data buffered by the VSC 71, the proxy transform module 72 determines whether transcoding is appropriate and, if so, what "level" of transcoding (i.e., the type(s) and extent of transcoding) is to be performed. Once these determinations are made, the proxy transform module 72 configures the audio transcoder 66a to perform the appropriate level (types or extent) of transcoding, as represented by the signal CONFIGURE in FIG. 5. To make the transcoding determinations, the proxy transform module 71 first configures the VSC 71 in random access mode and configures the VCS 71 to buffer some small amount of data (relative to the size of the audio file). The proxy transform module 72 then requests and examines, in a random access manner, audio data buffered in the VSC 71, until the proxy transform module 72 is able to make the transcoding determinations. Once the determinations have been made, the proxy transform module 72 then immediately switches the VSC 71 to the sequential mode. Hence, the VSC 71 buffers only as much data as is required to enable the transcoding determination to be made.

Prior to transmitting a file to the client, the proxy transform module 72 provides the client 1 with any information regarding the level of transcoding to be performed (if any) which may be required by the client 1 and which is not implicit in the transcoded file itself. This information is provided to the client 1 in the form of a special-purpose header, as represented by the signal HEADER. This header may specify the new file type and/or compression used, for example.

The audio transcoder 66a is a component of transcoder 66. The audio transcoder 66a requests data from the VSC 71, transcodes the received data, and provides a transcoded file to the client 1, as represented by signal AUDIO FILE. The audio transcoder 66a generally requests data for transcoding while the VSC 71 is in the sequential mode. Transcoding may begin before the file has been completely received by the WebTV server 5 from the remote server 4, which helps to reduce the latency experienced by the client 1. Similarly, downloading of the transcoded file to the client 1 may begin before the original file has been completely transcoded and/or before the original file has been completely received by the WebTV server 5 from the remote server 4. Downloading of the transcoded file to the client 1 can be performed by streaming the data, semi-streaming (in which relatively large portions of the file are transmitted at a time), or by transmitting the entire transcoded file in a single transmission.

Figure 6:
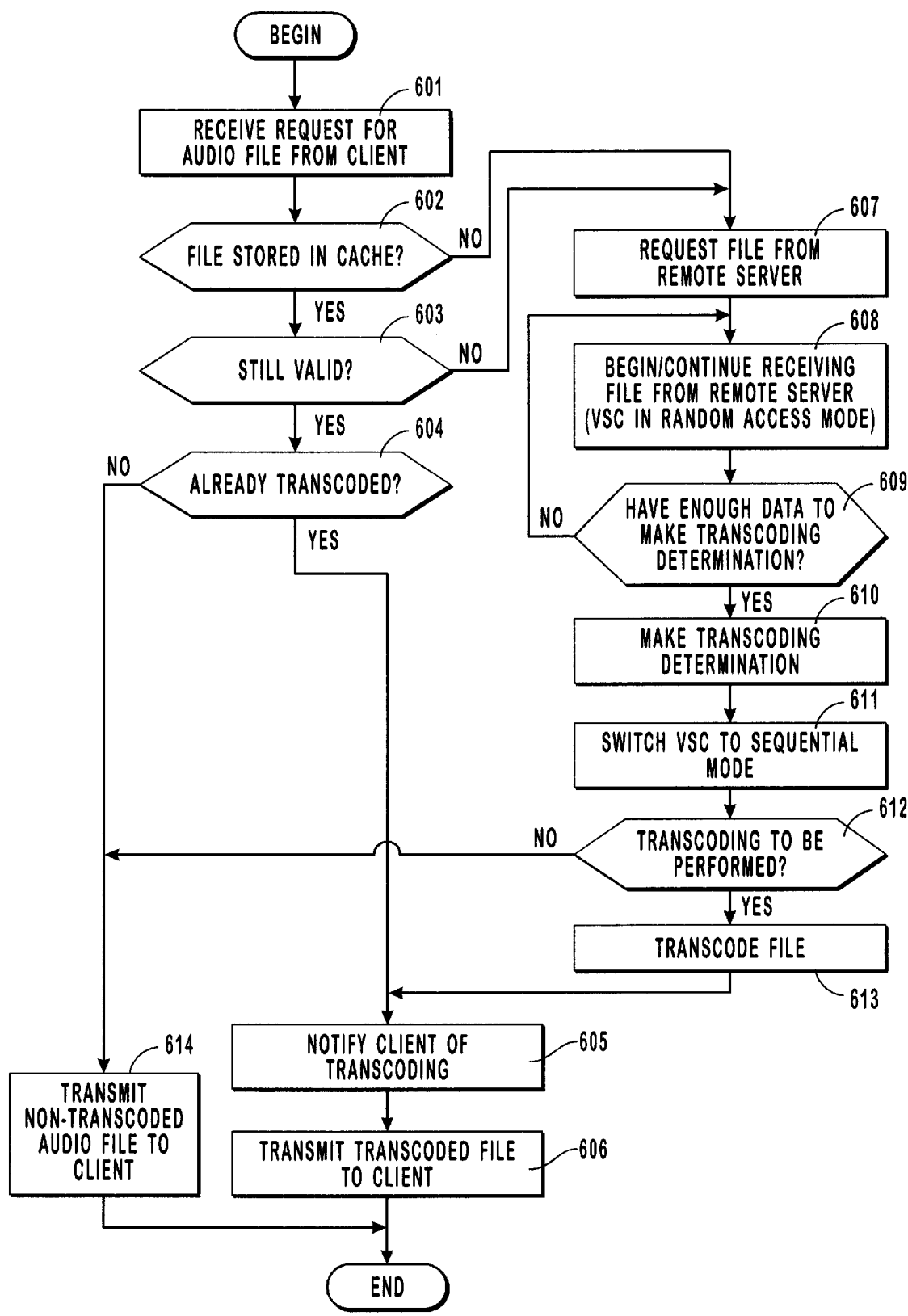
FIG. 6 is a flow diagram illustrating a routine for transcoding audio data.

FIG. 6 illustrates a routine for transcoding audio data performed by the server 5. In step 601, the WebTV server 5 receives a request for an audio file from the client 1. This request may result from the user of the client 1 activating a hypertext link associated with the audio file. In step 602 it is determined whether the requested audio file is currently stored in the proxy cache 65 of the server 5 (see FIG. 4). If the requested audio file is not present in the cache 65, then the server 5 requests the audio file from the appropriate remote server 4 in step 607. If the requested audio file is present in the cache 65, then it is determined in step 603 whether the stored file is still valid. Certain files obtained from Web servers remain valid only for limited times, which may be specified in the files themselves. Further, any file kept in the cache for some predetermined maximum time period without being updated from the remote server 4 may be considered invalid.

If the file is in the cache 65 and is no longer valid, then the routine branches to step 607 in which the server 5 requests the requested file from the appropriate remote server. If the file is in the cache 65 and is determined to be valid in step 603, then it is determined in step 604 whether the file was previously transcoded. If the file was not previously transcoded, then in step 614 the file is downloaded via the Internet 3 to the client 1 in its non-transcoded state. If the file was previously transcoded, then in step 605 the server 5 notifies the client 1 of the level of transcoding that was previously performed on the file, and in step 606 the transcoded file is downloaded to the client 1.

After an audio file is initially requested by the server 5 from a remote server 4 (step 607), the server 5 (more specifically, the VSC 71) begins to receive the audio file in step 608 from the remote server 4. Note that at this point, the VSC 71 is in the random access mode. In one embodiment, the audio file is converted into a stream of 16-bit raw data samples with no headers (i.e., headers within the original file are encoded into raw data). This conversion is performed on-the-fly, as the file is received.

In step 609, it is determined by the proxy transform module 72 whether enough of the audio file has been received to enable a decision to be made as to whether transcoding will be performed and, if so, what level (type and extent) of transcoding will be performed. For example, the header of a requested audio file might specify the length of the file, and the file might be sufficiently lengthy as to justify an immediate decision to compress the data the moment this fact is recognized. In another example, the audio file might already be compressed, and this fact might also be specified in a header of the audio file. Hence, a decision might then immediately be made not to compress the data further.

If a sufficient portion of the audio file has not yet been received, the WebTV server 5 continues to receive the audio file until a sufficient portion has been received. When a sufficient portion has been received, then a determination is made in step 610 whether transcoding will be performed and, if so, what level (type and extent) of transcoding will be performed. Next, in step 611 the VSC 71 is switched to sequential mode. If transcoding was determined not to be necessary or appropriate, the next routine branches in step 612 to step 614, in which the unaltered audio file is downloaded to the client 1. Note that downloading of the file to the client 1 may begin while portions of the file are still being received from the remote server 4. If it is determined that transcoding is to be performed, then in step 613, the audio transcoder 66a of the server 5 performs the appropriate transcoding. An intermediate step that is performed during transcoding is the conversion of the retrieved audio file into a common format to facilitate transcoding, including encoding any headers in the file into raw data.

In one embodiment, transcoding is performed according to any of three possible levels. At a first level of transcoding, audio transcoder 66a reduces the number of channels in the audio data. For example, if the audio file includes stereo data, the data may be converted into mono data. Such conversion may be performed, for example, by averaging corresponding data samples from two or more channels to generate a resultant sample. Reducing the number of channels is believed to generally have the least impact upon the quality of the resulting audio of the various transcoding techniques described herein. Therefore, if this level of transcoding is determined to be sufficient to meet hardware, software, bandwidth, and/or quality constraints, then no additional transcoding is prescribed.

At a second, more significant level of transcoding, the sample rate of the audio data is reduced. This level may involve interpolation between samples, if necessary, to generate resultant samples. The second level of transcoding is believed to generally have a greater impact on quality then the first level alone. Therefore, the second level of transcoding is prescribed only if the first level of transcoding is insufficient or inapplicable (e.g., if the audio data is in mono to begin with). The second level can also be performed in addition to the first level, if necessary.

At a third level of transcoding, the audio data is compressed. Compression tends to have the greatest impact on audio quality of the various transcoding techniques described herein. Any form of compression can be used, such as MPEG or CCITT (Comite Consultatif International Telegraphique et Telephonique/Consultative Committee for International Telegraph and Telephone) ADPCM (Adaptive Differential Pulse Code Modulation), for example.

In addition to the various levels of encoding, the audio file may be transcoded into a different file type, as noted above.

After the proper level of transcoding is determined, transcoding is performed in step 613. In step 605 the server 5 notifies the client 1 of the transcoding level, and the server 5 downloads the transcoded file to the client 1 in step 606. As noted above, transcoding (step 613) may begin before the file has been completely received by the WebTV server 5 from the remote server 4. Further, downloading of the transcoded file to the client 1 (step 606) may begin before the file has been completely transcoded and/or before the file has been completely received by the WebTV server 5 from the remote server 4. In addition, downloading of the transcoded file to the client 1 can be performed on a line-by-line basis (streaming), in portions of the file at a time (semi-streaming), or in a single transmission.

Thus, a method and apparatus for transcoding audio data have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. In a proxy computer having a connection to a client computer, a method of transcoding audio data by the proxy computer on behalf of the client computer, the method comprising the acts of:

obtaining audio data from a remote server on behalf of a client computer;

determining whether the obtained audio data is to be transcoded by the proxy computer;

if it is determined that the audio data is to be transcoded, transcoding the audio data prior to transmitting the audio data from the proxy computer to the client computer;

and transmitting the audio data from the proxy computer to the client computer.

2. A method as recited in claim 1, wherein the act of transcoding the audio data comprises the act of converting the audio data from stereo to mono.

3. A method as recited in claim 1, wherein the act of transcoding the audio data comprises the act of converting an audio format of the audio data from a first format to a second format.

4. A method as recited in claim 1, wherein the act of transcoding the audio data comprises the act of reducing a sample rate associated with the audio data.

5. A method as recited in claim 1, wherein the act of transcoding the audio data comprises the act of compressing the audio data.

6. In a proxy computer having a connection to a client computer, a method of transcoding audio data by the proxy computer on behalf of the client computer, the method comprising the acts of:

obtaining audio data from a remote server on behalf of a client computer;

determining whether the obtained audio data is to be transcoded by the proxy computer based on at least one capability of the client computer;

if it is determined that the audio data is to be transcoded, transcoding the audio data prior to transmitting the audio data from the proxy computer to the client computer; and transmitting the audio data from the proxy computer to the client computer.

7. A method as recited in claim 6, wherein the at least one capability of the client computer comprises audio formats that the client computer is configured to process.

8. A method as recited in claim 7, wherein:

it is determined that the audio data is to be transcoded if an audio format of the audio data is not included in the audio formats that the client computer is configured to process; and the act of transcoding comprises converting the audio format of the audio data to another audio format that is included in the audio formats that the client computer is configured to process.

9. A method as recited in claim 6, wherein the at least one capability of the client computer comprises a memory capacity of the client computer.

10. A method as recited in claim 9, wherein:

it is determined that the memory capacity of the client computer is not sufficient to store the audio data if the audio data were to be transmitted to the client computer without transcoding; and the act of transcoding comprises compressing the audio data so as to reduce the amount of the audio data that is transmitted to the client computer.

11. A method as recited in claim 9, wherein:

it is determined that the memory capacity of the client computer is not sufficient to store the audio data if the audio data were to be transmitted to the client computer without transcoding; and the act of transcoding comprises reducing a sample rate associated with the audio data so as to reduce the amount of the audio data that is transmitted to the client computer.

12. A method as recited in claim 9, wherein:

it is determined that the memory capacity of the client computer is not sufficient to store the audio data if the audio data were to be transmitted to the client computer without transcoding; and the act of transcoding comprises converting the audio data from stereo to mono so as to reduce the amount of the audio data that is transmitted to the client computer.

13. A method as recited in claim 6, wherein the at least one capability of the client computer comprises a bandwidth of a connection between the proxy computer and the client computer.

14. A method as recited in claim 13, wherein:

it is determined that the bandwidth is not sufficient to transmit the audio data to the client computer without introducing unacceptable latency if the audio data were to be transmitted to the client computer without transcoding; and the act of transcoding comprises compressing the audio data so as to enable the audio data to be transmitted to the client computer using the bandwidth of the connection.

15. A method as recited in claim 13, wherein:

it is determined that the bandwidth is not sufficient to transmit the audio data to the client computer without introducing unacceptable latency if the audio data were to be transmitted to the client computer without transcoding; and the act of transcoding comprises reducing a sample rate associated with the audio data so as to enable the audio data to be transmitted to the client computer using the bandwidth of the connection.

16. A method as recited in claim 13, wherein:

it is determined that the bandwidth is not sufficient to transmit the audio data to the client computer without introducing unacceptable latency if the audio data were to be transmitted to the client computer without transcoding; and the act of transcoding comprises converting the audio data from stereo to mono so as to enable the audio data to be transmitted to the client computer using the bandwidth of the connection.

17. A method as recited in claim 6, wherein the at least one capability of the client computer comprises the capability of the client computer to render audio data in mono but not in stereo.

18. A method as recited in claim 17, wherein the act of transcoding comprises converting the audio data from stereo to mono.

19. A method as recited in claim 6, further comprising the act of transmitting the audio data to the client computer without transcoding if it has been determined, based on the at least one capability of the client computer, that the obtained audio data is not to be transcoded by the proxy computer.

20. A method as recited in claim 6, further comprising, if the act of transcoding the audio data is performed, the act of informing the client computer of a type of transcoding that has been used to transcode the audio data, so as to permit the client computer to process the transcoded audio data.

21. A method according to claim 6, further comprising the acts of receiving a request for an audio file from the client computer, wherein the audio file includes the audio data and wherein the act of obtaining the audio data comprises the acts of:

requesting the audio file from the remote server in response to the request from the client; and receiving the requested audio file from the remote server in response to the act of requesting.

22. In a proxy computer having a connection to a client computer, a method of transcoding audio data by the proxy computer on behalf of the client computer, the method comprising the acts of:

obtaining audio data from remote server on behalf of a client computer;

determining whether, if the audio data were to be rendered without transcoding, the audio data would result in an audio quality that is greater than an audio quality that is desired or required at the client computer;

if it is determined that, if the audio data were to be rendered without transcoding, the audio data would result in an audio quality that is greater than an audio quality that is desired or required at the client computer, transcoding the audio data such the amount of audio data is reduced and the audio quality is also reduced; and transmitting the audio data from the proxy computer to the client computer.

23. A method as recited in claim 22, wherein the act of transcoding the audio data comprises the act of converting the audio data from stereo to mono.

24. A method as recited in claim 22, wherein the act of transcoding the audio data comprises the act of converting an audio format of the audio data from a first format to a second format.

25. A method as recited in claim 22, wherein the act of transcoding the audio data comprises the act of reducing a sample rate associated with the audio data.

26. A method as described in claim 22, wherein the act of transcoding the audio data comprises the act of compressing the audio data.

27. A proxy computer capable of establishing a connection to a client computer over a network, the proxy computer comprising:

- means for obtaining audio data from a remote server on behalf of the client computer;
- means for determining whether the obtained audio data is to be transcoded by the proxy computer based on at least one capability of the client computer;
- means for transcoding the audio data prior to transmitting the audio data from the proxy computer to the client computer if it is determined that the audio data is to be transcoded; and
- means for transmitting the audio data from the proxy computer to the client computer.

28. A proxy computer as recited in claim 27, wherein the means for transcoding are at least capable of converting the audio data from stereo to mono.

29. A proxy computer as recited in claim 27, wherein the means for transcoding are at least capable of converting an audio format of the audio data from a first format to a second format.

30. A proxy computer as recited in claim 27, wherein the means for transcoding are at least capable of reducing a sample rate associated with the audio data.

31. A proxy computer as recited in claim 27, wherein the means for transcoding are at least capable of compressing the audio data.

* * * * *

UNITED STATES PATENT AND TRADEMARK OFFICE
CERTIFICATE OF CORRECTION

PATENT NO. : 6,496,868 B2
DATED : December 17, 2002
INVENTOR(S) : Mark H. Krueger and Jay D. Logue It is certified that error appears in the above-identified patent and that said Letters Patent is hereby corrected as shown below:

<u>Title page,</u>
Item [56], OTHER PUBLICATIONS, after "Seidman" insert -- , --; and change "Emergine" to -- Emerging --

<u>Column 5,</u>
Line 49, change "flow" to -- now --

<u>Column 7,</u>
Line 51, change "6a" to -- 66a --

Signed and Sealed this

Twenty-third Day of September, 2003

JAMES E. ROGAN
*Director of the United States Patent and Trademark Office*